T. Evans,
Pail Ear.
No. 3,063. Reissued Aug. 4, 1868.
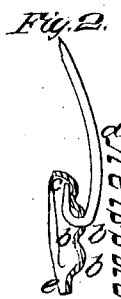
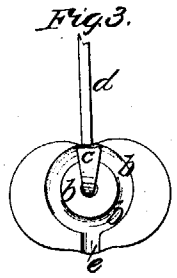
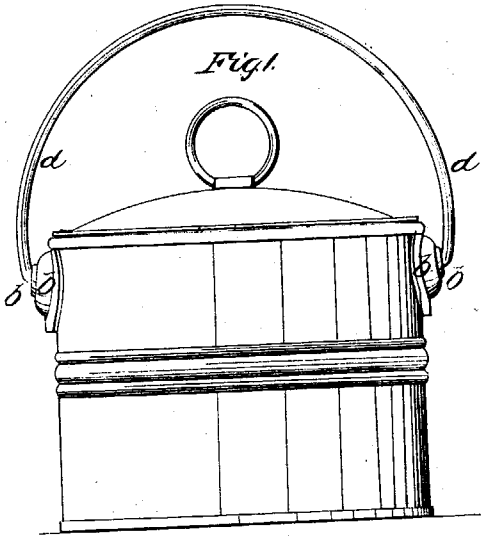
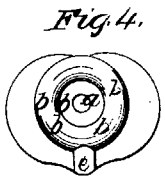
Witnesses:
Archibald Robbins
John Graham
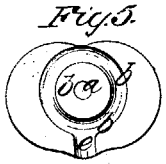
Inventor:
Thos. Evans
N. PETERS, PHOTO-LITHOGRAPHER, WASHINGTON, D. C.

UNITED STATES PATENT OFFICE.

THOMAS EVANS, OF NEWARK, NEW JERSEY.

IMPROVEMENT IN METALLIC EARS FOR ATTACHING HANDLES TO PAILS AND LIKE VESSELS.

Specification forming part of Letters Patent No. 24,451, dated June 21, 1859; Reissue No. 3,063, dated August 4, 1868.

*To all whom it may concern:*

Be it known that I, THOMAS EVANS, late of Watkins, in the county of Schuyler and State of New York, now of Newark, in the State of New Jersey, have invented certain Improvements in Metallic Ears for Attaching Bails to Pails and other Vessels; and I do hereby declare that the following is a full and exact description thereof, reference being had to the accompanying drawings, and to the letters of reference marked thereon, in which—

Figure 1 is an elevation, showing the ears applied to a tin pail. Fig. 2 is a vertical section of the ear, showing the manner of attaching the bail. Fig. 3 is a reverse elevation, showing the flattened end of the bail. Fig. 4 is a front elevation of the ear. Fig. 5 is a reverse elevation of the same.

Similar letters refer to corresponding parts in all the figures.

My improvements are applicable to those ears which are used for affixing bails to tin pails and other vessels and wares, which are attached externally to the sides, and do not extend above the top. In such the end of the bail passes through an eye, and is bent in the form of a hook, which turns within the concave or raised portion of the ear.

In my improved ear the eye *a* forms the center of a series of concentric corrugations, *b b b*, which may be more or less raised or depressed around it. These corrugations give increased strength to the part of the ear which rests on the bail, that being the point which receives all the weight of the vessel and its contents, and consequently requires unusual strength in comparison with the other parts. A swelled or convex ear simply is liable to be bent and drawn out of shape, and soon becomes useless from this cause, the material being too thin to retain its shape in ordinary use. This defect, though sufficiently overcome for ordinary uses by the corrugations, I further provide against by making the end *c* of the bail *d* bear against one of the rings or corrugations *b*, the outer one being the most convenient for the purpose, by which the eye is relieved of a considerable portion of the strain coming upon it, and thereby is less affected. This renders the bail less subject to becoming loose, as the eye is prevented in a great measure from wearing larger by the double bearing which is thus given the bail. The corrugations may be more or less in number, as the size or thickness of metal may require.

The end of the bail may be flattened after insertion, giving it a greater bearing-surface longitudinally of the corrugations, and likewise serving to prevent it from slipping out of the ear, as shown in Fig. 3; but this is not essential, as the ordinary round wire finds sufficient bearing, and cannot become detached if bent into the depression formed by the corrugations sufficiently. A groove or channel, *e*, is provided on the lower side of the ear, communicating with the interior cavity thereof, which allows the water that will at times enter the cavity of the ear through the eye to escape freely. This is an important requisite to the practical use of ears of this form, as moisture, if allowed to remain in the cavity, soon occasions rust to form, and the ear is spoiled by the corrosion of the thin metal of which it is made. This form of ear is preferable in many respects. It renders pails and other vessels more comely in appearance and convenient to use than when the bail is attached above the top. It possesses greater strength and durability than the ordinary ears, and is far cheaper, being produced by the single and almost instantaneous operation of a die or press instead of by hand labor. They are easily attached, either by solder or riveting, the surface being adapted for forming a good joint and strengthening the part to which they are attached, and they allow the bail to turn freely, while maintaining its double bearing in all positions.

I am aware that ears have been formed with a concave recess to receive the hook of the bail, and this, simply, I do not claim; but

What I claim as my invention, and desire to secure by Letters Patent, is—

1. Metallic ears for attaching the handles to pails and other vessels formed with concentric annular corrugations surrounding the bail-orifice, substantially as and for the purposes set forth.

2. So arranging the hooked ends of the bail as to give them an additional bearing against one or more of said corrugations, substantially as set forth.

3. The drip opening or passage formed by the downward continuation of the outer corrugation for draining the interior cavity, as shown and described.

4. A bail-ear formed with the portion surrounding the eye raised to receive the hooked end of the bail, when the marginal portion or portions thereof are formed on the plane of the part to which they are to be attached, substantially as set forth.

THOS. EVANS.

Witnesses:
J. FRASER,
G. M. LAWRENCE.